(12) United States Patent
Bowman et al.

(10) Patent No.: US 8,821,341 B2
(45) Date of Patent: Sep. 2, 2014

(54) OUTPUT TORQUE ERROR MITIGATION FOR STRONG HYBRID PRNDL NEUTRAL OPERATION

(71) Applicant: GM Global Technology Operations LLC, Detroit, MI (US)

(72) Inventors: Shaun C Bowman, Ann Arbor, MI (US); Poh Fong Chin, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 152 days.

(21) Appl. No.: 13/645,798

(22) Filed: Oct. 5, 2012

(65) Prior Publication Data

US 2014/0100076 A1    Apr. 10, 2014

(51) Int. Cl.
 *B60W 10/06* (2006.01)
 *B60W 10/08* (2006.01)
 *B60W 10/10* (2012.01)

(52) U.S. Cl.
 USPC ............................ 477/3; 477/906; 903/930

(58) Field of Classification Search
 USPC ................................................ 477/3; 903/930
 See application file for complete search history.

(56) References Cited

U.S. PATENT DOCUMENTS

| | | | |
|---|---|---|---|
| 6,845,305 B1 * | 1/2005 | Raftari et al. | 701/22 |
| 7,172,524 B2 * | 2/2007 | Moeller | 475/5 |
| 7,198,588 B2 * | 4/2007 | McGee et al. | 477/3 |
| 2013/0041533 A1 * | 2/2013 | Kim | 701/22 |
| 2013/0225363 A1 * | 8/2013 | Lehmen et al. | 477/4 |

* cited by examiner

*Primary Examiner* — Sherry Estremsky

(57) ABSTRACT

A powertrain system includes an internal combustion engine, at least one electric machine and an electro-mechanical transmission operative to transmit torque to a driveline. A method for controlling the powertrain system includes enabling neutral operation of the transmission in response to an operator input, activating a first clutch coupled to a first planetary gear set, the first planetary gear set which includes a first element, a second element and a third element. Torque commands are coordinated between the engine and a first electric machine to establish a net zero output torque condition. If a violation of the net zero output torque condition is present, slippage of the first clutch is allowed to dissipate net output torque from reacting with the driveline of the powertrain system.

20 Claims, 3 Drawing Sheets

OUTPUT TORQUE ERROR MITIGATION FOR STRONG HYBRID PRNDL NEUTRAL OPERATION

TECHNICAL FIELD

This disclosure is related to powertrain systems employing multiple torque-generative devices, and dynamic system controls associated therewith.

BACKGROUND

The statements in this section merely provide background information related to the present disclosure. Accordingly, such statements are not intended to constitute an admission of prior art.

Powertrain systems may be configured to transfer torque originating from multiple torque-generative devices through a torque transmission device to an output member that may be coupled to a driveline. Such powertrain systems include hybrid powertrain systems and extended-range electric vehicle systems. Control systems for operating such powertrain systems operate the torque-generative devices and apply torque transfer elements in the transmission to transfer torque in response to operator-commanded output torque requests, taking into account fuel economy, emissions, drivability, and other factors. Exemplary torque-generative devices include internal combustion engines and non-combustion torque machines. The non-combustion torque machines may include electric machines that are operative as motors or generators to generate a torque input to the transmission independently of a torque input from the internal combustion engine. The torque machines may transform vehicle kinetic energy transferred through the vehicle driveline to electrical energy that is storable in an electrical energy storage device in what is referred to as a regenerative operation. A control system monitors various inputs from the vehicle and the operator and provides operational control of the hybrid powertrain, including controlling transmission operating state and gear shifting, controlling the torque-generative devices, and regulating the electrical power interchange among the electrical energy storage device and the electric machines to manage outputs of the transmission, including torque and rotational speed.

It is known, for example, to shutdown hybrid powertrain systems after a short period of time during neutral operation when the hybrid powertrain system lacks a mechanical neutral, i.e., mechanical decoupling the driveline from the transmission, in order to prevent undesirable vehicle motion in the presence of a torque error. However, shutdown of the hybrid powertrain system can result in lost functionality of the vehicle such the desirability to utilize auxiliary components of the vehicle.

SUMMARY

A powertrain system includes an internal combustion engine, at least one electric machine and an electro-mechanical transmission operative to transmit torque to a driveline. A method for controlling the powertrain system includes enabling neutral operation of the transmission in response to an operator input, activating a first clutch coupled to a first planetary gear set, the first planetary gear set which includes a first element, a second element and a third element. Torque commands are coordinated between the engine and a first electric machine to establish a net zero output torque condition. If a violation of the net zero output torque condition is present, slippage of the first clutch is allowed to dissipate net output torque from reacting with the driveline of the powertrain system.

BRIEF DESCRIPTION OF THE DRAWINGS

One or more embodiments will now be described, by way of example, with reference to the accompanying drawings, in which:

FIGS. 2-1, 2-2 and 2-3 illustrate lever diagrams including a portion of a transmission for the powertrain system illustrated in FIG. 1 when neutral operation of the transmission is enabled in response to an operator input, in accordance with the present disclosure; and FIG. 3 illustrates a flow chart 300 for preventing net output torque reacting with a driveline from exceeding a motionless driveline threshold upon detection of a violation of a net zero output torque condition during neutral operation of an exemplary electro-mechanical transmission, in accordance with the present disclosure.

DETAILED DESCRIPTION

Figure 1:
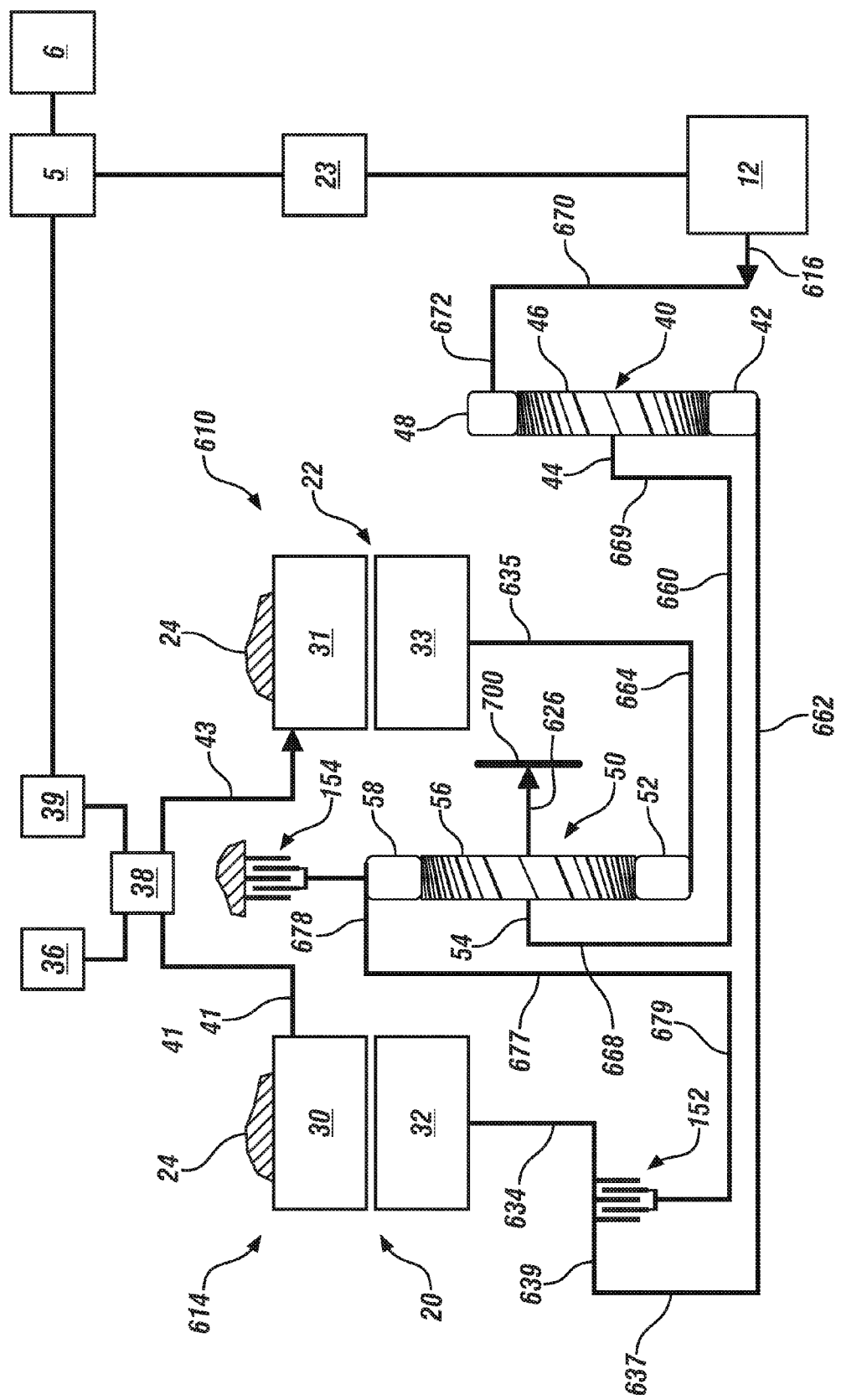
FIG. 1 illustrates a powertrain system having an internal combustion engine drivingly connected with a electro-mechanical transmission, a driveline, and a controller, in accordance with the present disclosure.

Referring now to the drawings, wherein the showings are for the purpose of illustrating certain exemplary embodiments only and not for the purpose of limiting the same, FIG. 1 illustrates a powertrain 610 having an internal combustion engine 12 drivingly connected with a electro-mechanical transmission 614. An output member of the engine 12 is connected for driving an input member 616 of the transmission 614.

A first electric machine 20 and a second electric machine 22 are packaged within a case housing/ground 24 and are operatively connected between the input member 616 and a transmission output member 626 that reacts with a driveline 700. The first electric machine 20 includes an annular stator 30 grounded to the transmission casing 24, an annular rotor 32 supported on and for rotation with a rotatable rotor hub 634. A high-voltage battery 36, power inverter 38 and electronic controller 39 are operatively connected with the stator 30 via transfer conductor 41 to control the functioning of the first electric machine 20 as a motor in which stored electrical power is provided by the battery 36 to the stator 30 or the electrical power can be provided by the road when the second electric machine 22 is acting as a generator, and a generator in which torque of the rotating rotor 32 is converted to electrical power stored in the battery 36 or used by the second electric machine.

Similarly, the second electric machine 22 includes an annular stator 31 grounded to the transmission casing 24, an annular rotor 33 supported on a rotatable rotor rub 635. The battery 36, power inverter 38 and electronic controller 39 are operatively connected with the stator 31 via transfer conductor 43 to control the functioning of the second electric machine 22 as a motor and a generator.

The transmission 614 further includes first and second planetary gear sets 40, 50, respectively. Planetary gear set 40 has a first member that is a sun gear 42, a second member that is a carrier member 44 that rotatably supports a plurality of pinion gears 46 meshing with the sun gear 42, and a third member that is a ring gear 48 meshing with the pinion gears 46.

Planetary gear set 50 has a first member which is a sun gear 52, a second member that is a carrier member 54 that rotatably supports a plurality of pinion gears 56 meshing with the sun gear 52, and a third member that is a ring gear 58 meshing with the pinion gears 56. Rotor hub 635 is connected for rotation with the sun gear 52 by intermediate sleeve shaft 664.

The transmission 614 includes a first clutch 154 and a second clutch 152. The first clutch 154, also referred to as a grounding clutch or brake, is selectively activated to ground the ring gear member 58 to the transmission casing 24. The input member 616 is axially spaced from and not concentric with shaft 660, which couples the carrier member 44 of the first planetary gear set 40 and the carrier member 54 of the second planetary gear set 50. Shaft 672 is coaxial with the input member 616. Input member 616 couples to hub member 670 and axially-extending portion 672 to couple the input member 616 for common rotation with the ring gear 48. Shaft 662 couples rotor hub 634 with sun gear 42 via hub member 637 and an axially-extending portion 639. The second clutch 152 is nested between an axially extending portion 639, a hub 637 and a shaft. A hub member 677 is connected with the second clutch 152. A separate sleeve shaft 660 concentric with shaft 662 couples carrier member 54 and hub member 668 and 669 to carrier member 44. Sleeve shaft 664 couples rotor hub 635 with sun gear 52. Axially-extending member 678, hub 677 and axially-extending member 679, which is an annular shaft, couples the second clutch 152 with the first clutch 154 and ring gear 58. Axial-extending member 678 circumscribes the planetary gear set 50. It will be appreciated that the ring gear member 58 is decoupled from the sun gear member 42 when the second clutch 152 is deactivated.

An engine control module (ECM) 23 is operatively connected to the engine 12, and functions to acquire data from sensors and control actuators of the engine 12 over a plurality of discrete lines. The ECM 23 monitors an actual engine input torque, $T_1$, provided to the transmission 614 at that point in time based upon monitored engine speed and load, which is communicated to a hybrid control module (HCP) 5. The electronic controller 39 monitors a first motor torque of the first electric machine 20 and a second motor torque of the second electric machine 22. Alternatively, two electronic controllers can be utilized, each controller monitoring respective ones of the first and second electric machines 20, 22, respectively. The HCP 5 provides supervisory control over the ECM 23 and the electronic controller 39 and a gear selector lever 6 which is operatively connected to receive inputs from a vehicle operator. The HCP 5 can further control activation and deactivation of the first and second clutches 154, 152, respectively. The HCP 5 coordinates torque commands amongst the engine 12 and the first and second electric machines 20, 22, respectively, to establish a net zero output torque condition during neutral operation of the transmission 614 in response to an operator input to the gear selector lever 6.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

Figures 1, 2:
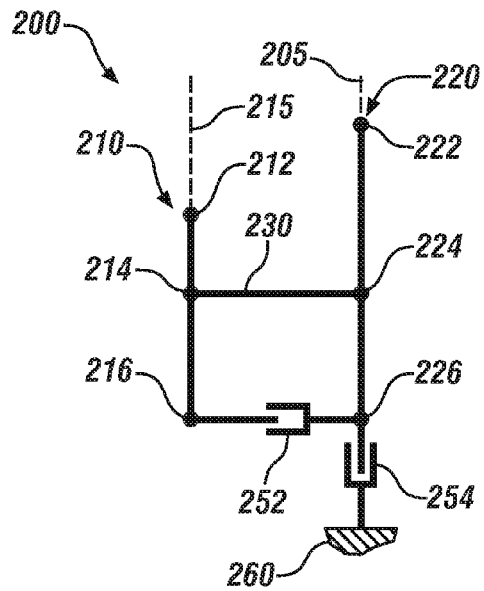
Figure 2:
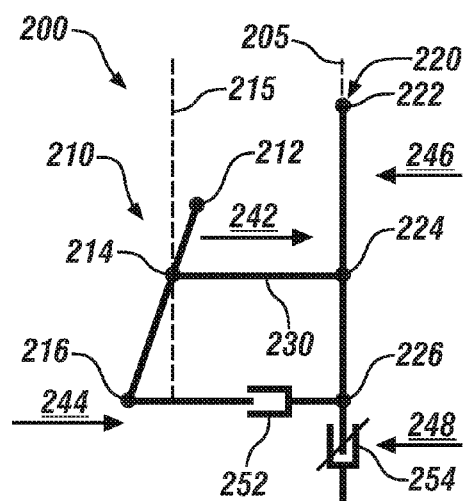

FIG. 2-1 is an embodiment of a lever diagram for the powertrain system 610 illustrated in FIG. 1 including a portion of the transmission 200 that is configured to transfer torque between an internal combustion engine, first and second electric machines and an output member coupled to a driveline of a vehicle. The transmission 200 includes first and second planetary gear sets 220, 210, respectively, a first clutch 254, a second clutch 252 and a case ground 260. In an exemplary embodiment with reference to FIG. 1, the first planetary gear set 220 corresponds to the second planetary gear set 50, the second planetary gear set 210 corresponds to the first planetary gear set 40, the first clutch 254 corresponds to the first clutch 154 and the second clutch 252 corresponds to the second clutch 152 and the case ground 260 corresponds to the transmission casing 24.

The second planetary gear set 210 includes a first element 216, a second element 214 and a third element 212. The first element 216 is coupled to a first electric machine and coupled to one element of the second clutch 252. The second element is coupled to a rotating shaft 230 and the third element 212 is coupled to an engine. In the exemplary embodiment with reference to FIG. 1, the first element 216 corresponds to the sun gear 42, the second element 214 corresponds to the carrier member 44, the third element 212 corresponds to the ring gear 48, the first electric machine corresponds to the first electric machine 20, the rotating shaft 230 corresponds to shaft 660 and the engine corresponds to the internal combustion engine 12.

Similarly, the first planetary gear set 220 includes a first element 226, a second element 224 and a third element 222. The first element 226 is coupled to the other element of the second clutch 252 and coupled to one element of the first clutch 254. Hence, the first element 226 is coupled to the first electric machine when the second clutch 252 is activated and decoupled from the first electric machine when the second clutch 252 is deactivated. The second element 224 is coupled to the rotating shaft and an output member to a driveline. The third element 222 is coupled to the second electric machine. The other element of the first clutch 254 is coupled to the case ground 260. Hence the first clutch 254 is a grounding clutch configured to ground the first element 226 of the first planetary gear set 220 when the first clutch 254 is activated. In the exemplary embodiment with reference to FIG. 1, the first element 226 corresponds to the ring gear 58, the second element 224 corresponds to the carrier member 54, the third element 222 corresponds to the sun gear 52, the second electric machine corresponds to the second electric machine 22, the output member corresponds to the output member 626 and the driveline corresponds to the driveline 700.

Rotational speeds of elements of the first planetary gear set 220 are shown in relation to a first vertical axis 205 and rotational speeds of elements of the second planetary gear set 210 are shown in relation to a second vertical axis 215. The horizontal positions of the aforementioned elements of the first and second planetary gear sets 220, 210, respectively, indicate rotational speeds thereof. As shown, the powertrain system is not operating and the rotational speeds of all the elements are zero, as indicated by their horizontal orientations relative to the first and second axes 205, 215, respectively.

FIG. 2-2 depicts the transmission 200 operating in neutral. Enabling neutral operation of the transmission 200 can be in response to an operator input to a gear selector lever, e.g., an operator selecting neutral on a PRNDL lever. The transmission 200 lacks a mechanical disconnect from the driveline. In other words, the transmission 200 is operating in neutral without mechanically decoupling the output member from the driveline. Accordingly, engine torque 242, i.e., engine input torque provided to the transmission 200, a first motor torque 244 from the first electric machine and a second motor 246 torque from the second electric machine must be balanced to establish a net zero output torque from the transmission 200 to the driveline. The second clutch 252 is deactivated. Further, the first clutch 254 is activated and provides a reactive torque 248 to assist in establishing the net zero output torque from the transmission 200 to the driveline. Due to the balanced torques to establish the net zero output torque from the transmission to the driveline, an operator perceives the transmission as operating in neutral without the transmission providing a mechanical decoupling or disconnect from the driveline. In an exemplary embodiment, the engine torque 242 is a positive engine torque, the first motor torque 244 is a positive motor torque and the second motor torque 246 is a negative motor torque. In a non-limiting example, the engine torque 242 is 20 Nm, the first motor torque 244 is 11 Nm, the second motor torque 246 is −10 Nm and the reactive torque 248 provided by the first clutch 254 is −21 Nm to establish a net zero output torque condition or net zero output torque from the transmission to the driveline.

Figures 2, 3:
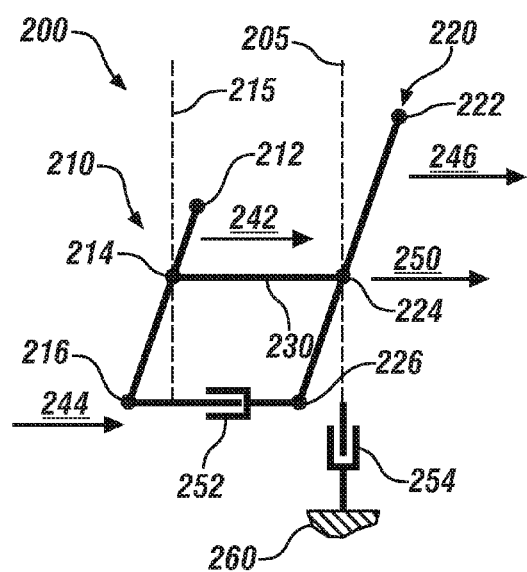
Figure 3:
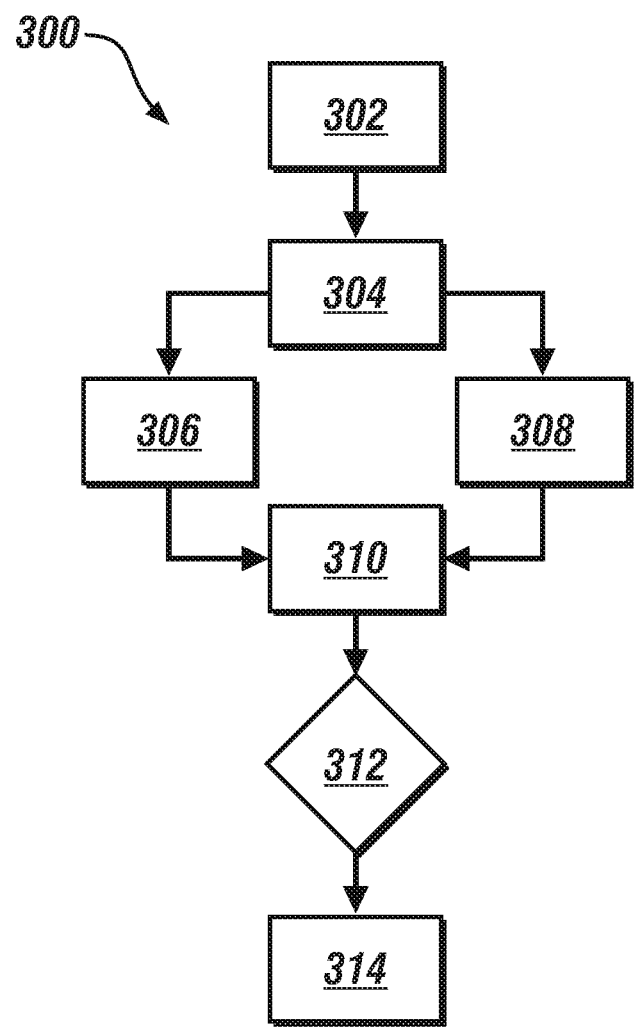

FIG. 2-3 depicts the transmission 200 operating in neutral when a torque error is detected in the second motor 246 torque from the second electric machine. The first clutch 254 comprises a maximum torque capacity that is exceeded only in the presence of a torque error allowing slippage of the first clutch. In the exemplary embodiment illustrated in FIG. 2-3, the torque error is present based on the second motor torque 246 deviating from the torque command of the second electric machine by a magnitude exceeding a second electric machine error. However, the presence of a torque error can be detected in any one of the engine torque 242, the first motor torque 244 and the second motor torque 246. In another exemplary embodiment, the presence of the torque error is based upon an occurrence of slippage within the first clutch 254 without the need of monitoring the second motor torque 246 and detecting the torque error if the second motor torque 246 deviates from the torque command of the second electric machine by the magnitude exceeding the second electric machine error. In other words, the first clutch 254 can be monitored, and if an occurrence of slippage within the first clutch 254 is present, the torque error is present in any one of the engine torque 242, the first motor torque 244 and the second motor torque 246.

As will be discussed in greater detail with reference to the flowchart 300 illustrated in FIG. 3, allowing slippage within the first clutch 254 dissipates net output torque from reacting with the driveline as a result of the detected torque error. In an exemplary embodiment, the allowed slippage within the first clutch 254 prevents net output torque reacting with the driveline from exceeding a motionless driveline threshold. It will be appreciated that net output torque reacting with the driveline that exceeds the motionless driveline threshold would result in undesirable motion of the vehicle. In a non-limiting example, the engine torque 242 is 20 Nm, the first motor torque 244 is 11 Nm, the second motor torque 246 is greater than 15 Nm and net output torque 250 is less than 75 Nm.

In an exemplary embodiment with reference to FIGS. 1, 2-1, 2-2 and 2-3, FIG. 3 illustrates a flow chart 300 for a routine preventing net output torque reacting with a driveline from exceeding a motionless driveline threshold upon presence of a violation of a net zero output torque condition during neutral operation of an exemplary electro-mechanical transmission. It will be appreciated that the exemplary routine can be implemented within the HCP 5 illustrated in FIG. 1. Table 1 is provided as a key to FIG. 3, wherein the numerically labeled blocks and the corresponding functions are set forth as follows.

TABLE 1

| BLOCK | BLOCK CONTENTS |
|---|---|
| 302 | Determining an operator input selecting neutral operation of the transmission. |
| 304 | Enabling neutral operation of transmission without mechanically decoupling the transmission from a driveline. |
| 306 | Activating a first clutch configured to ground an element of a first planetary gear set and deactivating a second clutch configured to decouple the element of the first planetary gear set from an element of a second planetary gear set. |
| 308 | Commanding a net zero output torque from the transmission to the driveline based on balancing torque commands between each of an engine the first and second electric machines. |
| 310 | Monitoring the first clutch, engine torque, a first motor torque from the first electric machine and a second motor torque from the second electric machine. |
| 312 | Is a torque error present based on the monitored engine torque, the first motor torque and the second motor torque or is the torque error present based upon an occurrence of slippage within the first clutch? |
| 314 | Allowing slippage within the first clutch to prevent net output torque reacting with the driveline from exceeding a motionless driveline threshold when the torque error is present. |

Referring to block 302, it has been determined that neutral operation of the transmission has been selected based on an operator input. In an exemplary embodiment, the HCP 5 monitors an operator input to a gear selector lever 6, e.g., a PRNDL lever.

Referring to block 304, neutral operation of the transmission in response to the operator input is enabled. As aforementioned, neutral operation of the transmission 614 is provided without mechanically decoupling the transmission 614 from the driveline 700.

Referring to block 306, enabling neutral operation of the transmission includes activating a first clutch coupled to a first planetary gear set. The exemplary first planetary gear set 220 includes the first element 226, the second element 224 and the third element 222. In an exemplary embodiment, the first clutch 254 is a grounding clutch configured to ground the first element 226 of first planetary gear set 220 when the first clutch 254 is activated, the second element 224 of the first planetary gear set 220 is coupled to an output member (e.g., output member 626) that reacts with the driveline (e.g., driveline 700) and the third element 222 of the first planetary gear set 220 is coupled to a second electric machine (e.g, second electric machine 22). Referring to FIG. 2-2, the first clutch 254 includes a maximum torque capacity that provides reactive torque 248 utilized in association with balanced torque commands of the engine and the first and second electric machines when a torque error is not present, i.e., a violation of a net zero output torque condition is not present. Similarly, the presence of the torque error can be determined when solely on the first clutch 254 slipping without monitoring torque amongst the engine and the first and electric machines and determining the presence of the violation of the net zero output torque condition therefrom. It will be further appreciated that if neutral operation of the transmission is enabled from a previous operation of the transmission at which the first clutch 254 is already activated, clamping force available to the first clutch may be reduced to achieve the maximum torque capacity associated with neutral operation of the transmission to thereby allow slipping of the clutch in the presence of a detected torque error discussed in greater detail below.

Enabling neutral operation of the transmission further includes deactivating a second clutch. In an exemplary embodiment, deactivating the second clutch 252 decouples the first element 226 of the first planetary gear set 220 from a first element 216 of the second planetary gear set 210. The second planetary gear set 210 includes the first element 216 coupled to the first electric machine (e.g., first electric machine 20), a second element 214 coupled to the second element 224 of the first planetary gear set 220 via rotating shaft 230 and a third element 212 coupled to an engine (e.g., engine 12).

Referring to block 308, enabling neutral operation of the transmission further includes coordinating torque commands amongst the engine and the first and second electric machines to establish a net zero output torque condition. In other words, a net zero output torque from the transmission to the driveline is commanded based on balancing torque commands between each of the engine and the first and second electric machines. In an exemplary embodiment, with reference to FIG. 2-2, coordinating torque commands amongst the engine (e.g., engine 12) and the first and second electric machines (e.g., first and second electric machines 20,22, respectively) includes commanding a positive engine torque 242, commanding a positive first motor torque 244 from the first electric machine and commanding a negative or reactive second motor torque 246 from the second electric machine. As aforementioned, the activated and grounded first clutch 254 provides a reactive torque 248 when the first clutch 254 is not slipping. It will be appreciated that the sum of the engine torque 242, the first motor torque 244, the second motor torque 246 and the reactive torque 248 provided by the first clutch is equal to zero, and thus, provides a net zero output torque from the transmission to the driveline. In the exemplary embodiment, the commanded engine torque 242 is 20 Nm and supports engine operation at a minimum engine speed associated with engine idle operation enabling generation of electrical energy through the second electric machine for storage within the battery 36. It will be appreciated that the torque command of the engine supports engine operation sufficient to powering auxiliary components of the vehicle system. Known hybrid powertrains fail to support engine operation associated with engine idle operation enabling generation of electrical energy for storage within a high voltage battery, and instead, drain the high-voltage battery and a low-voltage battery (e.g., 12-volt battery) for powering auxiliary components, and ultimately key-off the powertrain after an elapsed period of time.

Block 310 monitors the first clutch 254, an engine torque, a first motor torque from the first electric machine and a second motor torque from the second electric machine.

Block 312 determines whether a torque error is present based on the monitored engine torque, the first motor torque and the second motor torque or whether the torque error is present based upon an occurrence of slippage within the first clutch 254. In other words, block 312 determines if a violation of the net zero output torque condition is present. In an exemplary embodiment with reference to FIGS. 2-2 and 2-3, the engine torque is compared to the coordinated torque command of the engine, i.e., the commanded engine torque 242. In one exemplary embodiment, if the engine torque deviates from the coordinated torque command of the engine by a magnitude exceeding an engine error threshold, the presence of the violation of the net zero output torque condition is determined. In another exemplary embodiment, the first motor torque from the first electric machine is compared to the coordinated torque command of the first electric machine, i.e., the commanded positive first motor torque 244. If the first motor torque deviates from the coordinated torque command 244 of the first electric machine by a magnitude exceeding a first electric machine error threshold, the presence of the violation of the net zero output torque condition is determined. In another exemplary embodiment, the second motor torque from the second electric machine is compared to the coordinated torque command of the second electric machine, i.e., the commanded negative second motor torque 246. If the second motor torque deviates from the torque command 246 of the second electric machine by a magnitude exceeding a second electric machine error threshold, the presence of the violation of the net zero output torque condition is determined. In another exemplary embodiment, the first clutch is monitored. If an occurrence of slippage is present within the monitored first clutch, the violation of the net zero output torque condition is present.

Therefore, a torque error may be present based on the monitored first clutch, the monitored engine torque, the first motor torque and the second motor torque only if at least one of the monitored engine torque deviates from the torque command of the engine by the magnitude exceeding the engine error threshold, the monitored first motor torque deviates from the torque command of the first electric machine by the magnitude exceeding the first electric machine error threshold, the monitored second motor torque deviates from the torque command of the second electric machine by a magnitude exceeding the second electric machine error threshold and an occurrence of slippage is present within the monitored first clutch. It will be appreciated that each of the engine error threshold, the first electric machine error threshold and the second electric machine error threshold are calibrated to not trigger a torque error in response to slight fluctuations and deviations in the monitored torque values from their respective torque commands. Similarly, the thresholds can be calibrated to only detect a torque error proportional to torque magnitudes that will result in undesirable motion in the driveline.

In a non-limiting example, FIG. 2-3 illustrates the second motor torque deviating from the torque command 246 of the second electric machine by a magnitude exceeding the second electric machine error threshold resulting in a presence of the violation of the net zero output torque condition. The presence of the torque error is denoted by a second motor torque 246 being positive. In a non-limiting example, the second motor torque 246 is greater than 15 Nm resulting in a violation of the net zero output torque condition, i.e., detected torque error in the second electric machine. It is recognized that the presence of the torque error results in net output torque 250 reacting with the driveline.

With reference to decision block 312, a "0" denotes that the violation of the net zero output torque condition has not been violated, i.e., no torque error present in any of the engine or the first and second electric machines. The routine reverts back to decision block 312. A "1" denotes that the violation of the net zero output torque condition has been violated, i.e., a torque error is present in at least one of the engine, the first electric machine and the second electric machine. The routine then proceeds to decision to block 314 where a Key-Off event is performed. Alternatively, the engine torque and the motor torques can be terminated and the vehicle can be permitted to operate in neutral without generating power to supply auxiliary loads.

When the violation of the net zero output torque condition has been violated, denoted by a "1" in decision block 312, net output torque may react with the driveline may causing undesirable vehicle motion. Net output torque may be dissipated from reacting with the driveline of the powertrain system by allowing slippage of the first clutch. In an exemplary embodiment, allowing slippage within the first clutch 254 grounding the first element 226 of the first planetary gear set 220 may prevent net output torque reacting with the driveline from exceeding a motionless driveline threshold. It will be appreciated that the motionless driveline threshold is selected such that net output torques exceeding the motionless driveline threshold would result in traction toque applied to the wheels of the vehicle, and thus, undesirably move the vehicle. In a non-limiting example, the motionless driveline threshold is 75 Nm. Additionally, roadway grade, tire pressure, vehicle mass may also be taken into consideration when selecting the motionless driveline threshold.

Referring to FIG. 2-3, the maximum torque capacity of the first clutch 254 is exceeded only in the presence of the torque error allowing slippage of the first clutch 254. Thus, the maximum torque capacity of the activated first clutch 254 is exceeded upon presence of the violation of the net zero output torque condition by a minimum net output torque transferred to the output member of the transmission allowing slippage of the activated first clutch 254 and preventing the net output torque reacting with the driveline from exceeding the motionless driveline threshold.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for controlling a powertrain system comprising an internal combustion engine, at least one electric machine and an electro-mechanical transmission operative to transmit torque to a driveline, the method comprising:
    enabling neutral operation of the transmission in response to an operator input;
    activating a first clutch coupled to a first planetary gear set, the first planetary gear set comprising a first element, a second element and a third element;
    coordinating torque commands between the engine and a first electric machine to establish a net zero output torque condition; and
    if a violation of the net zero output torque condition is present, allowing slippage of the first clutch to dissipate net output torque from reacting with the driveline of the powertrain system.

2. The method of claim 1 wherein the neutral operation of the transmission is enabled in response to an operator input to a gear selector lever.

3. The method of claim 1 wherein the activating the first clutch coupled to the first planetary gear set, further comprises:
    deactivating a second clutch decoupling the first element of the first planetary gear set from a first element of a second planetary gear set, the second planetary gear set comprising the first element coupled to the first electric machine, a second element coupled to the second element of the first planetary gear set via a rotating shaft and a third element of the second planetary gear set coupled to the engine.

4. The method of claim 1 wherein the first clutch is a grounding clutch configured to ground the first element of the first planetary gear set when the first clutch is activated, the second element of the first planetary gear set is coupled to an output member that reacts with the driveline and the third element of the first planetary gear set is coupled to a second electric machine.

5. The method of claim 1 wherein coordinating torque commands among the engine and said first electric machine to establish the net zero output torque condition comprises:
    commanding a positive engine torque;
    commanding a positive first motor torque from a first electric machine; and
    commanding a negative second motor torque from a second electric machine.

6. The method of claim 5 wherein the commanded positive engine torque supports engine operation at a minimum engine speed associated with engine idle operation enabling generation of electrical energy through said second electric machine for storage within a battery.

7. The method of claim 1 further comprising:
    monitoring engine torque;
    comparing the engine torque to the coordinated torque command of the engine; and
    determining the presence of the violation of the net zero output torque condition when the engine torque deviates from the coordinated torque command of the engine by a magnitude exceeding an engine error threshold.

8. The method of claim 1 further comprising:
    monitoring a first motor torque from said first electric machine;
    comparing the first motor torque from said first electric machine to the coordinated torque command of said first electric machine; and
    determining the presence of the violation of the net zero output torque condition when the first motor torque from said first electric machine deviates from the coordinated torque command of said first electric machine by a magnitude exceeding a first electric machine error threshold.

9. The method of claim 1 further comprising:
    monitoring a second motor torque from a second electric machine;
    comparing the second motor torque from said second electric machine to the coordinated torque command of said second electric machine; and
    determining the presence of the violation of the net zero output torque condition when the second motor torque from said second electric machine deviates from the coordinated torque command of said second electric machine by a magnitude exceeding a second electric machine error threshold.

10. The method of claim 1 further comprising:
    monitoring the first clutch; and
    determining the presence of the violation of the net zero output torque condition when an occurrence of slippage is present within the first clutch.

11. The method of claim 1 wherein allowing slippage of the first clutch to dissipate net output torque from reacting with the driveline of the powertrain system comprises:
    utilizing a maximum torque capacity of the first clutch that is exceeded upon presence of the violation of the net zero output torque condition by a minimum net output torque transferred to an output member of the transmission allowing the slippage of the first clutch and preventing the net output torque reacting with the driveline from exceeding a motionless driveline threshold.

12. The method of claim 1 further comprising at least one of:
   initiating a key-off event of the powertrain system in response to allowing slippage of the first clutch; and
   terminating coordinating torque commands in response to allowing slippage of the first clutch.

13. Method for controlling a powertrain system of a vehicle comprising an internal combustion engine, first and second electric machines, an electro-mechanical transmission comprising at least one planetary gear set configured to transmit torque to a driveline, the method comprising:
   in response to an operator input selecting neutral operation of the transmission, operating the transmission in neutral without mechanically decoupling the transmission from the driveline comprising:
      commanding a net zero output torque from the transmission to the driveline based on balancing torque commands among each of the engine and the first and second electric machines,
      monitoring engine torque, a first motor torque from the first electric machine and a second motor torque from the second electric machine,
      monitoring a first clutch grounding an element of the first planetary gear set;
      determining a presence of a torque error based on the monitored first clutch, the monitored engine torque, the first motor torque and the second motor torque, and
      allowing slippage within the first clutch to prevent net output torque reacting with the driveline from exceeding a motionless driveline threshold.

14. The method of claim 13 wherein determining the presence of the torque error based on the monitored first clutch, the monitored engine torque, the first motor torque and the second motor torque comprises:
   comparing the monitored engine torque to the torque command of the engine;
   comparing the monitored first motor torque to the torque command of the first electric machine;
   comparing the monitored second motor torque to the torque command of the second electric machine;
   detecting the torque error only if at least one of
      the monitored engine torque deviates from the torque command of the engine by a magnitude exceeding an engine error threshold,
      the monitored first motor torque deviates from the torque command of the first electric machine by a magnitude exceeding a first electric machine error threshold,
      the monitored second motor torque deviates from the torque command of the second electric machine by a magnitude exceeding a second electric machine error threshold, and
      an occurrence of slippage is present within the monitored first clutch.

15. The method of claim 13 wherein the torque command of the engine supports engine operation sufficient for powering auxiliary components of the system.

16. The method of claim 13 wherein the first clutch grounding the element of the first planetary gear set comprises the first clutch having a maximum torque capacity that is exceeded only in the presence of the torque error allowing slippage of the first clutch.

17. The method of claim 16 wherein the maximum torque capacity of the first clutch provides reactive torque utilized to assist in establishing the commanded net zero output torque from the transmission to the driveline based on balancing torque commands among each of the engine and the first and second electric machines when the torque error is not present.

18. The method of claim 13 wherein at least one of the balanced torque commands of the first and second electric machines comprises a negative torque command.

19. Apparatus for controlling neutral operation in a powertrain system of a vehicle, the apparatus comprising:
   an internal combustion engine;
   first and second electric machines;
   an electro-mechanical transmission mechanically-operatively coupled to the internal combustion engine and the first and second electric machines adapted to selectively transmit mechanical power to an output member that reacts with a driveline;
   a control module:
      enabling neutral operation of the transmission in response to an operator input,
      activating a first clutch coupled to a first element of a first planetary gear set,
      coordinating torque commands between the engine and the first electric machine to establish a net zero output torque condition, and
      if a violation of the net zero output torque condition is present, allowing slippage of the first clutch to dissipate net output torque from reacting with the driveline of the powertrain system.

20. The apparatus of claim 19 further comprising:
   a second clutch deactivated and decoupling the first element of the first planetary gear set from a second element of a second planetary gear set;
   a second element of the first planetary gear set coupled to the output member and to a second element of the second planetary gear set;
   the engine coupled to a third element of the second planetary gear set;
   the first electric machine coupled to the first element of the second planetary gear set; and
   the second electric machine coupled to a third element of the first planetary gear set.

* * * * *